A. E. STENBERG.
TRANSMISSION.
APPLICATION FILED MAY 20, 1918.
1,306,978.
Patented June 17, 1919.
2 SHEETS—SHEET 2.
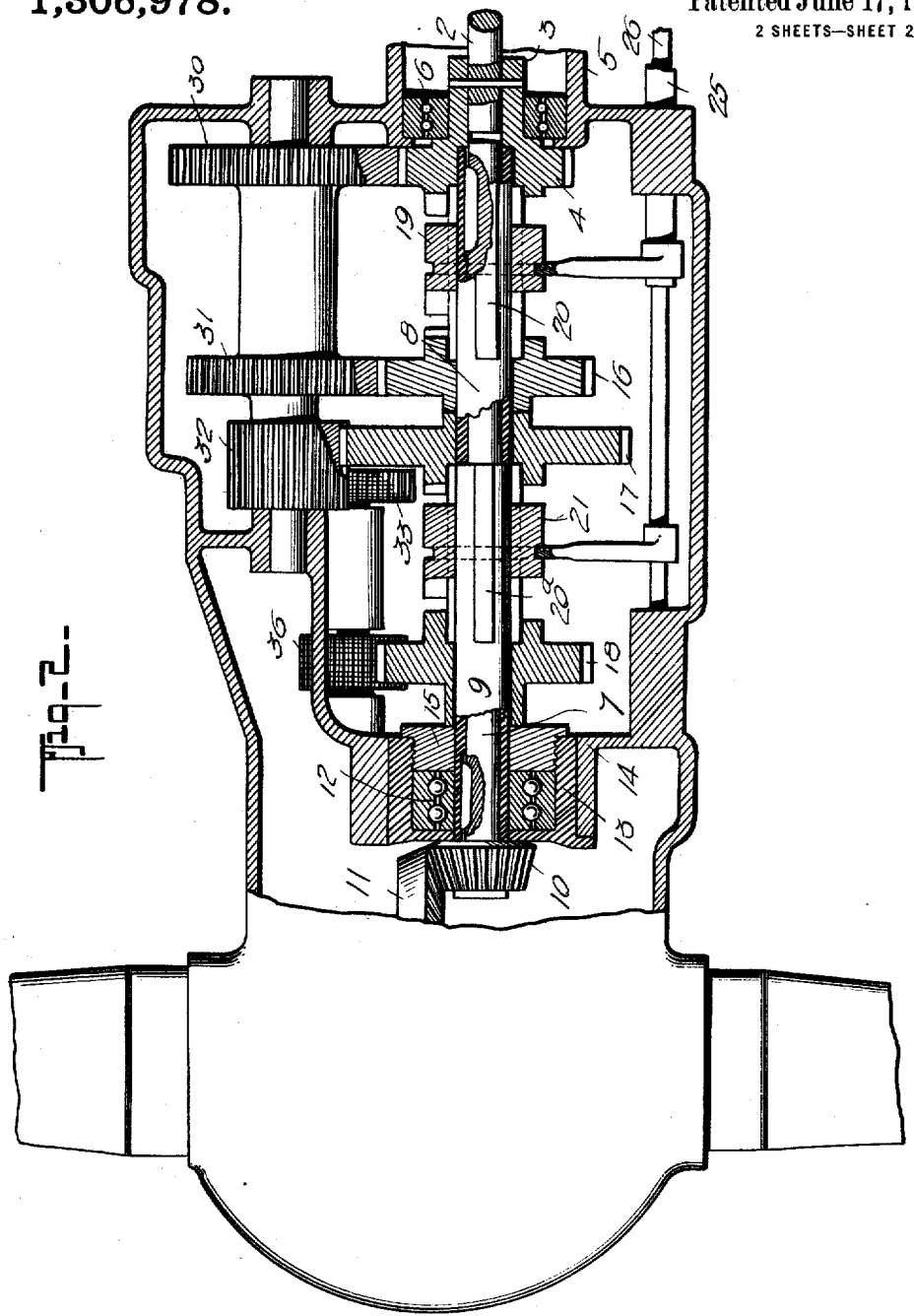
WITNESSES
H. Woodard
INVENTOR
Arvid E. Stenberg
BY
ATTORNEYS

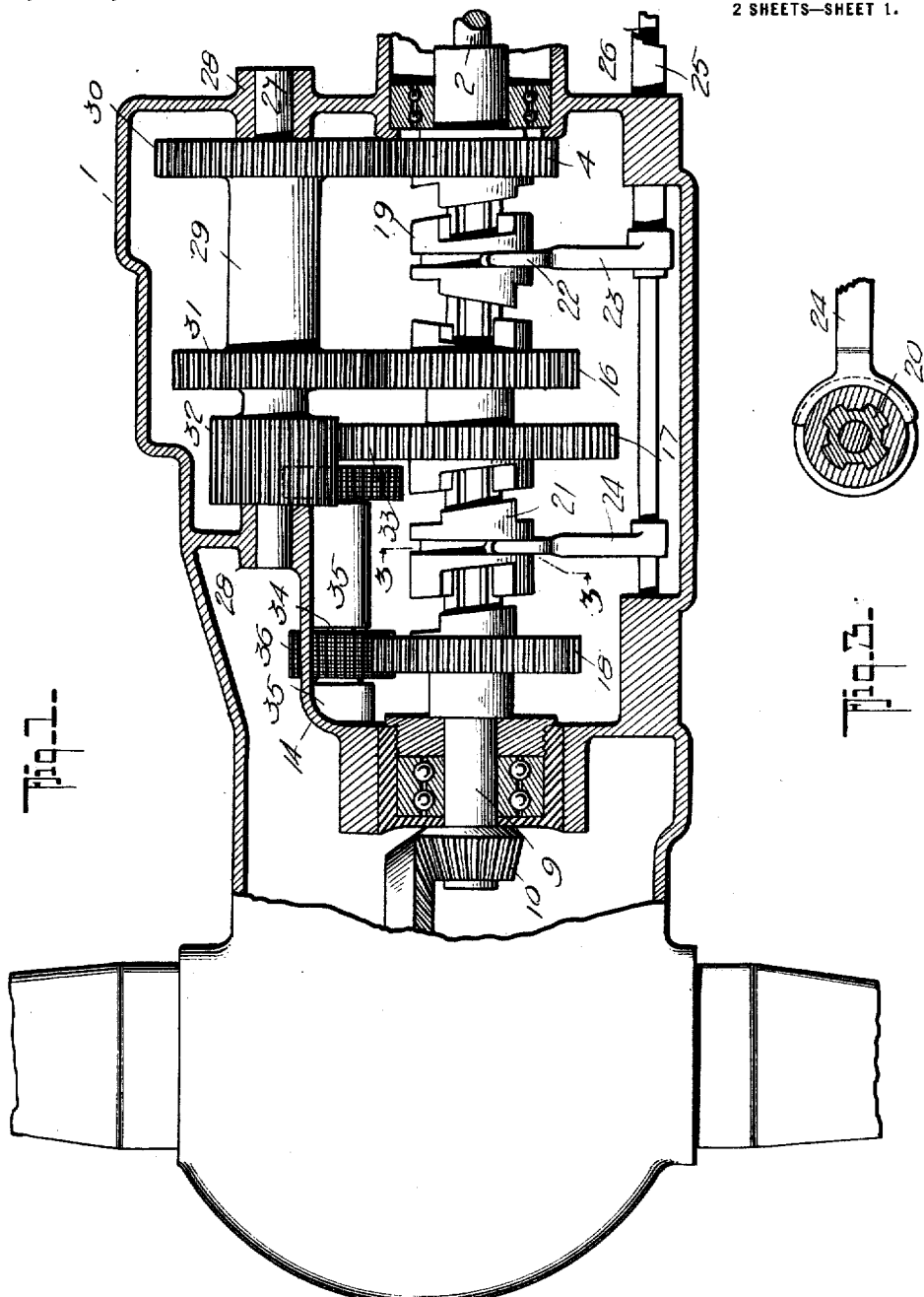

UNITED STATES PATENT OFFICE.

ARVID EMANUEL STENBERG, OF REED CITY, MICHIGAN.

TRANSMISSION.

1,306,978.　　　　　Specification of Letters Patent.　　Patented June 17, 1919.

Application filed May 20, 1918. Serial No. 235,707.

*To all whom it may concern:*

Be it known that I, ARVID EMANUEL STENBERG, a citizen of the United States, and a resident of Reed City, in the county of Osceola and State of Michigan, have invented certain new and useful Improvements in Transmissions, of which the following is a specification.

My invention is an improvement in transmissions, and has for its object to provide a simple, economical and efficient transmission especially adapted for motor vehicles.

In the drawings:

Figure 1 is a top plan view of the improved transmission, with parts in section;

Fig. 2 is a section through the transmission;

Fig. 3 is a section on the line 3—3 of Fig. 1, looking in the direction of the arrows adjacent to the line.

The present embodiment of the invention is arranged within a housing 1 of suitable construction, and the engine or driving shaft 2 has its end received within the hub 3 of a pinion or gear wheel 4, the said hub being journaled in a bearing 5 in the end of the housing, a ball bearing 6 being interposed between the bearing 5 and the hub.

The driven shaft 7 is arranged in alinement with the driving shaft, and sleeves 8 and 9 are mounted upon this driven shaft 7. The gear wheel 4 has an axial recess in the end remote from the driving shaft, which receives the adjacent end of the sleeve 8, and the end of the shaft 7 remote from the sleeve 8 has a bevel pinion 10 which meshes with the bevel gear wheel 11 of the differential of usual construction.

A ball bearing 12 is arranged between the sleeve 9 and a bushing 13 which is held within a bearing nipple in a web 14 within the housing, and a nut 15 is threaded into the inner end of the bushing. Gear wheels 16 and 17 are journaled loosely on the sleeve 8 and a gear wheel 18 is journaled loosely on the sleeve 9. The gear wheels 4 and 16 are adapted to be connected to the sleeve 8 by means of a clutch element 19 which is splined upon the sleeve 8 between the gear wheels 4 and 16, and these gear wheels, as shown, have clutch sections adapted to coöperate with the ends of the sliding section 19 to connect either gear wheel to the sleeve.

As shown in Fig. 3, four keys or splines 20 are provided for connecting the sliding element to the sleeve, and the sliding element has longitudinally extending grooves for receiving the splines or keys. A second sliding element 21 is arranged between the gear wheels 17 and 18 for connecting the said gear wheels in alternation to the sleeve 9, and this sliding element is splined upon the sleeve 9 in the same manner as the sliding element 19 is splined upon the sleeve 8 by keys or splines 20ª. Each of these sliding elements 19 and 21 is provided with an annular groove which is engaged by the arms 22 of a fork on an arm 23 and 24, respectively, the arm 23 being rigid with the sleeve 25, while the arm 24 is rigid with the rod 26.

The sleeve 25 is mounted on the rod 26 and both sleeve and rod are movable longitudinally independently of each other by suitable mechanism arranged adjacent to the driver. Thus either gear 4, 16, 17 or 18 may be connected with its adjacent sleeve.

A countershaft 27 is journaled in bearings 28 in the end of the housing and in the web 14. Upon this countershaft is arranged a sleeve 29, and this sleeve is provided with gear wheels 30, 31 and 32, the gear wheel 32 being of comparatively great length, as shown. The gear wheel 30 meshes with the gear wheel 4, the gear wheel 31 meshes with the gear wheel 16 and the gear wheel 32 meshes with the gear wheel 17 and also with a gear wheel 33 on a shaft 34 journaled in bearings 35 on the web 14. This shaft 34 carries also a gear wheel 36 which meshes with the gear wheel 18. The sleeves 8 and 9 are rigid with the shaft 7, being keyed thereto, as shown in Fig. 2.

In operation, with the parts in the position of Figs. 1 and 2, the engine or driving shaft runs free without affecting the driven shaft. The gear wheels 4 and 30, 16 and 31, 17 and 32, 32 and 33, 18 and 36 are always in mesh. When it is desired to run upon the low speed, the rod 26 is moved in the direction to cause the sliding element 21 to clutch the gear wheel 17 to the sleeve 19 and to the shaft 7. Now the driven shaft is driven through the gears 4—30, 17—32, and since the gear 30 is larger than the gear 4 and the gears 17 larger than the gear 32, low speed will be obtained. To obtain the intermediate speed the gear wheel 17 is released, and the gear wheel 16 is connected with the driven shaft. The driven shaft is now driven by the gears 4—30, 16—31, and since the gears 16 and 31 are of the same size, a higher speed will be obtained. To obtain the high speed, the gear 16 is released and the gear 4 is connected with the driven shaft, and the drive is now direct. To reverse, the gear 4 is released and the gear 18 is connected with the driven shaft. The drive is now through the gears 4—30, 32—33, 36—18 and the reverse is obtained.

I claim:

1. A transmission comprising alined driving and driven shafts, a countershaft parallel with the said shafts, a gear wheel secured to the driving shaft, a gear wheel journaled loosely on the driven shaft adjacent thereto, the countershaft having gear wheels meshing with the said first named gear wheels, clutch mechanism splined to the driven shaft and movable into engagement with either of the first named gear wheels to alternately connect the said wheels to the driven shaft, a pair of gear wheels journaled loosely on the driven shaft, a clutch section splined to the driven shaft between the gear wheels and having means for connecting either to the driven shaft, a gear wheel on the countershaft meshing with one of the said pair of gear wheels, a reverse shaft, and gear wheels on the said reverse shaft meshing with the last named gear wheel of the countershaft and with the other of the said pair of gear wheels of the driven shaft, respectively, all of the gear wheels on the countershaft being rigidly connected, and means for independently moving either clutch section, said gear wheels being of various sizes to provide varying speeds.

2. A transmission comprising alined driving and driven shafts, a countershaft parallel with the said shafts, a gear wheel secured to the driving shaft, a gear wheel journaled loosely on the driven shaft adjacent thereto, the countershaft having gear wheels meshing with the said first named gear wheels, clutch mechanism splined to the driven shaft and movable into engagement with either of the first named gear wheels to alternately connect the said wheels to the driven shaft, a pair of gear wheels journaled loosely on the driven shaft, a clutch section splined to the driven shaft between the pair of gear wheels and having means for connecting either to the driven shaft, a gear wheel on the countershaft meshing with one of the said pair of gear wheels, a reverse shaft, and gear wheels on the said reverse shaft meshing with the gear wheel of the countershaft and with the other of the said pair of gear wheels of the driven shaft, respectively, all of the gear wheels on the countershaft being rigidly connected.

ARVID EMANUEL STENBERG.

Witnesses:
A. M. FLEISCHHAUER,
E. M. PARKHURST.

Copies of this patent may be obtained for five cents each, by addressing the "Commissioner of Patents, Washington, D. C."